United States Patent [19]

Teske et al.

[11] 3,757,968

[45] Sept. 11, 1973

[54] APPARATUS FOR DISCHARGING BULK MATERIAL FROM STORAGE BUNKERS

[76] Inventors: Fritz Teske, Industriestr. 28; Lothar Teske, Industriestr. 30, both of 505 Porz-Westhoven; Robert Dreismann, Niehler-Kirchweg 139, 5 Cologne-Weidenpesch, all of Germany

[22] Filed: Oct. 15, 1970

[21] Appl. No.: 81,087

[30] Foreign Application Priority Data
Oct. 15, 1969 Germany.................. P 19 51 840.2
Oct. 9, 1970 Germany.................. P 20 49 655.3

[52] U.S. Cl................. 214/17 B, 198/50, 214/17 D
[51] Int. Cl........................................... B65g 65/48
[58] Field of Search...................... 214/17 D, 17 DA, 214/17 CA, 18 PH, 18.2, 35 R, 35 A, 17 B; 198/37, 48–51, 212; 222/410

[56] References Cited
UNITED STATES PATENTS
2,151,511   3/1939   Hagen.......................... 214/35 A X
2,612,298   9/1952   Wearne............................. 222/410
2,739,800   3/1956   Sisco.............................. 214/18.2 X FOREIGN PATENTS OR APPLICATIONS
971,533    9/1964   Great Britain................. 214/18 PH
876,378    5/1953   Germany......................... 214/17 D
1,014,201  12/1965  Great Britain................. 214/17 DC Primary Examiner—Robert G. Sheridan
Attorney—Spencer & Kaye

[57] ABSTRACT

Apparatus for assisting the discharge of bulk material from a bunker to a conveying system has a stationary casing connected to a bunker for sealing the lower end thereof and arranged in communication with a discharge opening of the bunker and with a conveying system. A discharge wheel is arranged in the casing and for rotation in the horizontal plane for feeding material received from the bunker to the conveying system.

3 Claims, 10 Drawing Figures

Patented Sept. 11, 1973

INVENTORS.
Fritz Teske
Lothar Teske
Robert Dreismann

BY *Spencer & Kaye*

ATTORNEYS.

Patented Sept. 11, 1973

INVENTORS.
Fritz Teske
Lothar Teske
Robert Dreismann

BY Spencer & Kaye
ATTORNEYS.

Patented Sept. 11, 1973

Patented Sept. 11, 1973

INVENTORS.
Fritz Teske
Lothar Teske
Robert Dreismann

BY Spencer & Kaye
ATTORNEYS.

Patented Sept. 11, 1973

INVENTORS.
Fritz Teske
Lothar Teske
Robert Dreismann

BY Spencer & Kaye
ATTORNEYS.

Patented Sept. 11, 1973 3,757,968

INVENTORS.
Fritz Teske
Lothar Teske
Robert Dreismann

BY Spencer & Kaye
ATTORNEYS.

APPARATUS FOR DISCHARGING BULK MATERIAL FROM STORAGE BUNKERS

BACKGROUND OF THE INVENTION

The present invention is related to the discharge of bulk materials from storage bunkers and consists of a tapering storage bunker under which is located a horizontal rotating discharge wheel. The function of the discharge wheel is to extract material from the bunker section and discharge it through an opening in a table positioned under the discharge wheel.

The tapered bunker section of previous inventions has incorporated a continuous monolithic slot along the base of the bunker. Above this base is a horizontal rotating discharge wheel which works on the base and moves along the length of the bunker outlet slot. With the assistance of this discharge wheel, material is removed from the bunker through the slot in the bunker base to a belt conveyor running in the same direction as the bunker slot.

The slot in the bunker base is also covered by a roof type of construction to protect the discharge wheel drive and travel mechanisms from the material stored within the bunker.

SUMMARY OF THE INVENTION

It is the object of the present invention to simplify the above described system with a system which is cheaper in overall capital cost. The present invention solves problems associated with material discharge from bunkers by incorporating the main parts of the rotating discharge wheel within a completely independant stationary casing. This casing also seals the lower part of the bunker. From the casing the rotating discharge wheel discharges material through an opening to a conveying system.

Furthermore, the concept of this new type of discharge system is such that it can be used to good advantage on long bunkers which previously could only be discharged by means of a travelling type of discharge machine. On long bunkers, a number of independant casings, each housing a discharge wheel and driven by separate drives, are located below the bunker and seal its base.

By using this arrangement it is possible to eliminate the present very expensive costs involved in constructing the monolithic slotted and roofed bunker base together with the monolithic tunnel under the bunker. Also eliminated is the cost of providing driving equipment for moving the machine along the length of the bunker.

The present invention makes it possible to discharge material from several zones simultaneously without detriment to the whole conveying system.

In the present invention an improved characteristic over the previously described unit is that the discharge wheel is located in a cylindrical casing of steel construction, with a single discharge outlet situated in the base of the casing. The diameter of the casing is larger than the diameter of the discharge wheel, and the section of the bunker above the wheel is a chute of increasing width and length which is an integral part of the wheel casing.

The outlet in the base of the discharge wheel casing in the present invention is a diametrically located slot through which the wheel discharges material. Located above this slot, and also above the discharge wheel, is a cross beam which is attached to the walls of the steel casing. The width of the cross beam is never less than the width of the bunker outlet slot.

This method of construction enables the manufacturing costs of the discharge equipment to be kept to a minimum.

The inclusion of the cross beam in the device according to the present invention serves a twofold purpose in so far as that by being attached to the walls of the steel casing it makes the assembly rigid and, secondly, since the plates which comprise the cross beam are inclined with an apex at their uppermost ends it prevents the material from passing directly through the bunker. A further object of the present invention is to provide an outside mounted drive mechanism which in conjunction with the equipment located under the cross beam gives a turning moment to the discharge wheel. It is preferable that the driving gear should be self-locking. A chain drive located under the cross beam connects the drive gear to the discharge wheel. In this manner a very robust driving mechanism is achieved.

An advantageous development of the present invention is the use of discharge wheel arms which take the form of a logarithmic spiral, and this feature ensures that the discharge wheel always turns forward through the material.

Furthermore, it is possible under certain circumstances to construct a number of discharge wheels, all of which can be driven from a single, central driving mechanism.

A further advantageous characteristic of the present invention is the inclusion of the known principle of the needle damper to vary the flow of material onto the discharge wheel.

The inclusion of this damper also enables the discharge wheel to be completely isolated from the flow of material.

A further advantage of the present invention is a savings in cost which is achieved by directly attaching a continuous conveyor to the base of the discharge wheel casing under and in the same direction as the discharge wheel slot.

Another advantageous feature of the present invention is that it can be employed for the discharge of hot materials from bunkers, for example, a material such as hot limestone. This is achieved by mounting the inlet chute section of the invention parallel to, but off-center with respect to the discharge wheel shaft. The base of the chute is closed and only part of the discharge wheel is in this area, another section of the wheel being in a shaft located parallel to the inlet chute into which the material will be discharged. In this manner, it is possible to have the inlet chute and the material discharge point diametrically opposed with the driving mechanism located between them. In this way, the bearings and driving mechanism for the discharge wheel are outside the path of the bulk material, whose temperature can for example, reach 400° C.

Another advantageous characteristic of the present invention is that the casing of the discharge machine can be provided with one or more supports which when positioned on load cells and linked to suitable control equipment can regulate the quantity of material being fed into the chute section of the invention.

In addition to the above use, a further advantageous feature of the present invention is that by using temperature control equipment to sense the temperature in a furnace shaft, it is possible by means of impulses transmitted through the control equipment to vary the speed of the discharge wheel and, hence, discharge more or less material to the furnace shaft. This makes it possible to keep the temperature in the shaft substantially constant. In this manner, a very simple, robust and fully automatically controlled system is achieved to regulate the rate of material discharge.

A further advantageous characteristic of the present invention is that in order to achieve a higher rate of discharge it is possible to fix the discharge wheel shaft at only one point; specifically at the end of a cantilever beam. The cantilever beam a which has a V-profile is attached to the discharge wheel casing at one side thereof and extends to a point just beyond the position of the discharge wheel shaft.

In this manner, using the same size of steel casing as in the design of machines previously described, a larger cross sectional area is provided from which material can be removed. In addition, movement within the material above the discharge wheel is created due to the larger area the discharge wheel moves through and, thus, the unit can be effectively used to discharge very sticky materials.

The effectiveness of the action of the new invention when operating on sticky materials is increased when several discharge wheels are situated together. The movement created by one discharge wheel passes to the vicinity of a neighboring wheel through the medium of the material, thereby improving the flow characteristics of the bulk material.

A further object of the present invention is that in the base of the discharge wheel casing is an opening through which the bulk material can be discharged. This opening is located below the cantilever beam — from the center line of the discharge wheel shaft to the wall of the steel casing — and can be of square or other configuration. The longest sides of this opening are radial to the discharge wheel casing.

In addition to the above, another advantageous feature of the present invention is that very little space is required beneath the outlet opening for locating a continuous conveyor. This conveyor is positioned in such a manner that the length of the conveyor runs across the longest radial side of the discharge opening.

When several discharge wheels are operating together, it is possible with the present invention to use a single common variable driving system which in conjunction with separate chain drives gives the driving moment to the discharge wheels. With this system of chain drives, it is possible to dismantle any chain, thereby isolating a discharge wheel while the other discharge wheels continue to operate.

This last feature has the advantage that if any machine is stopped by the dismantling of a chain drive, the desired discharge capacity of the material can be maintained by increasing the speed of the other discharge wheels.

For this special feature, the common drive gear has an infinitly variable output speed which is produced by the use of a hydraulic system.

To obtain a higher rate of discharge, a further ingenious development of the present invention is that the driving wheel shaft passes through the base of the discharge wheel casing and is fastened under the base. The gear of the discharge wheel is located below the base of the casing.

The discharge wheel is entirely covered by the bulk material and the lack of a cross beam or cantilever beam allows the bulk material to pass unhindered onto the discharge wheel. This permits the discharge wheel to pass through the complete area of the material within the bunker, thereby creating movement within the material.

A further advantageous characteristic of the present invention is that a chute is attached under the opening in the base of the discharge wheel casing and this chute allows the material to be fed onto a continuous conveyor.

DESCRIPTION OF THE PREFERRED EMBODIMENTS

Figure 1:
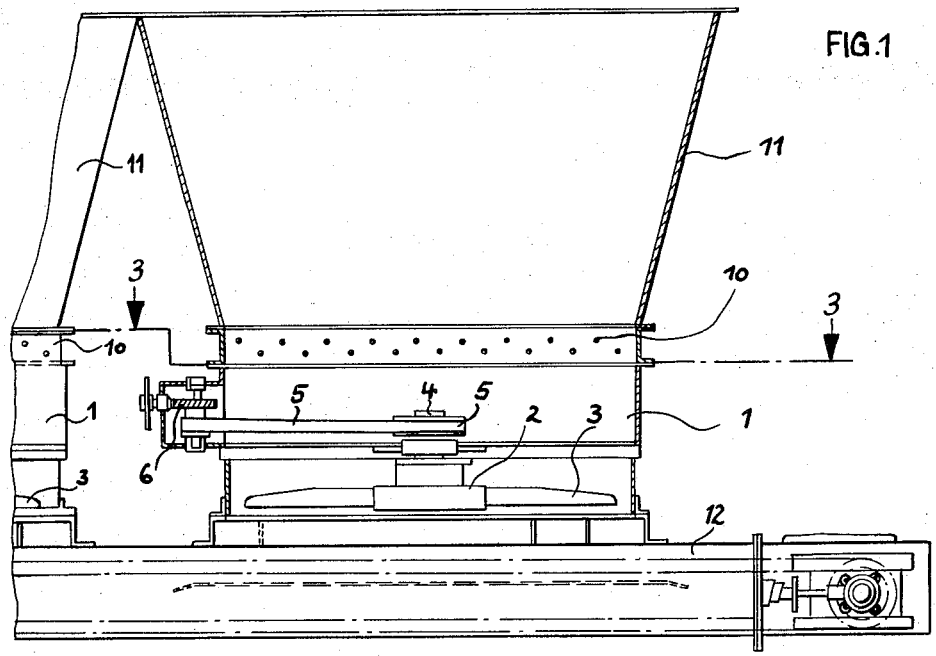
FIG. 1 is a schematic, side elevation view, partly in cross section, of a first embodiment of the apparatus according to the present invention.
Figure 3:
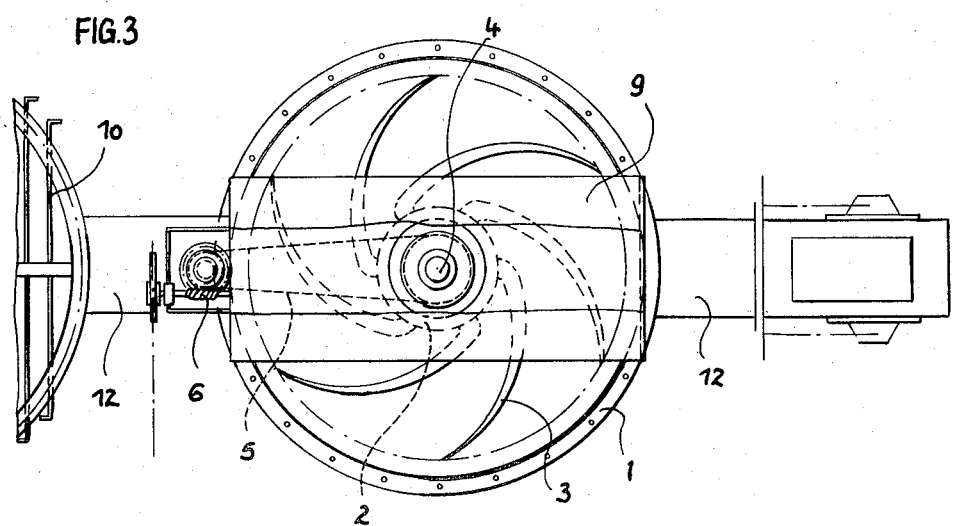
FIG. 3 is a top plan view taken generally along the line 3—3 of FIG. 1.
Figure 2:
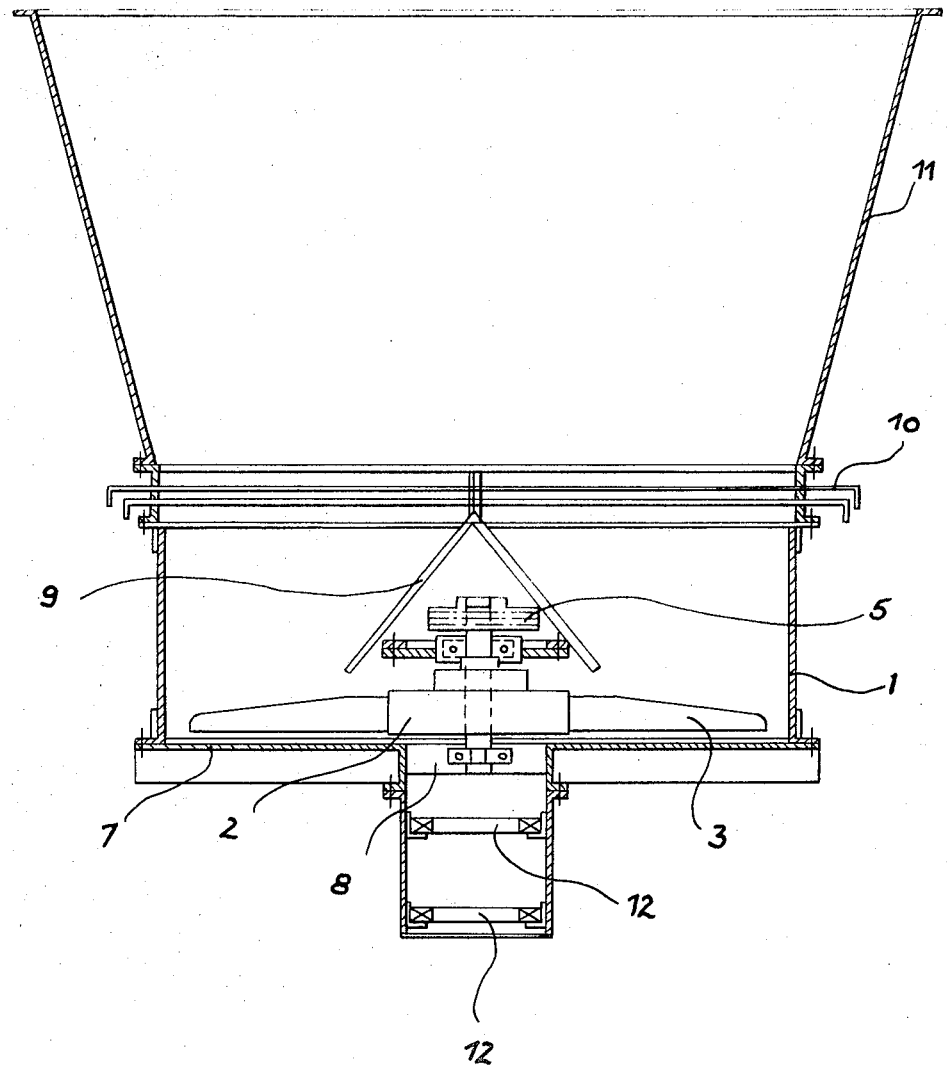
FIG. 2 is a schematic, cross-sectional view, of the embodiment of FIG. 1.

FIGS. 1 to 3 show a vertically oriented, cylindrical steel casing 1 and horizontally rotating discharge wheel 2 with forwardly directed arms 3 in the form of logarithmic spiral working through the material in spade fashion and fastened to a movable gear. In this manner, it is possible for discharge wheel 2 to go over the complete area of the casing 1 which is attached to the base of a bunker. In certain circumstances it is of advantage if the discharge wheel only passes through one section of the area at the lower part of the bunker. The shaft 4 of the discharge wheel 2 is driven by a chain drive 5 which is connected to a worm reduction gear 6 located outside of the casing 1. Worm reduction gear 6 is driven by a motor which is not illustrated. In the base 7 of the casing 1 is located a diametrical slot 8 through which bulk material is discharged. Above slot 8 is a crossbeam 9 constructed from inclined plates by which the gear and chain drive 5 are covered. This crossbeam spans the casing 1.

Above casing 1 is attached a previously known needle damper 10. To this damper is attached a chute 11 which has upwardly expanding cross-sectional dimensions as shown in cross section in FIGS. 1 and 2. To the underside of the base 7 in the same direction as the base slot 8 a continuous conveyor 12 — for example a chain or belt conveyor — is positioned. The discharge wheel can have a diameter of from 0.5 to 6.0 M.

Figure 4:
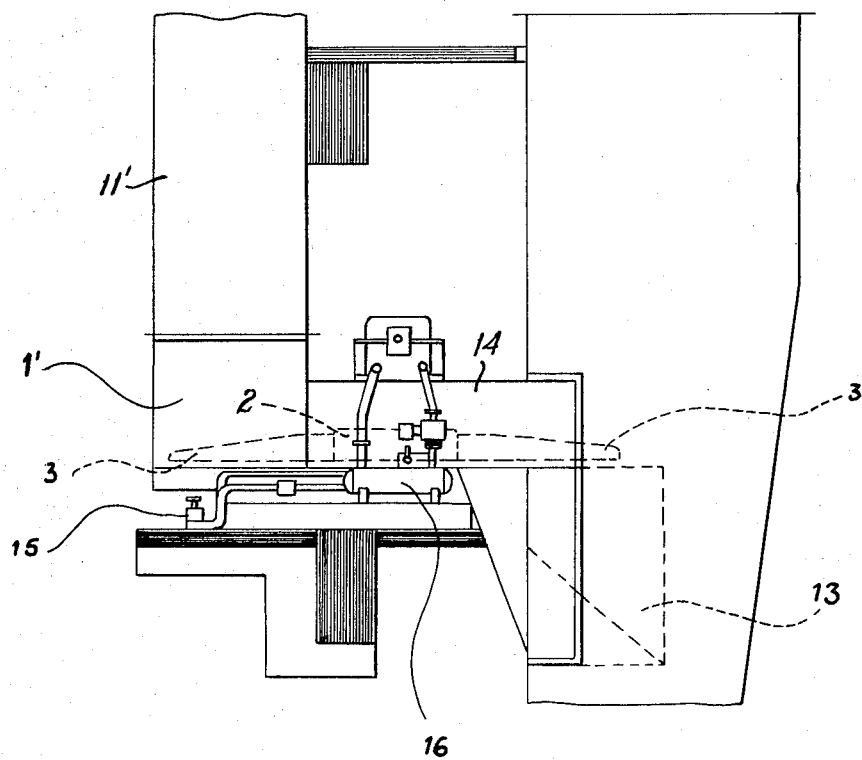
FIG. 4 is a schematic, partial side elevation view of a second embodiment of apparatus according to the present invention.
Figure 5:
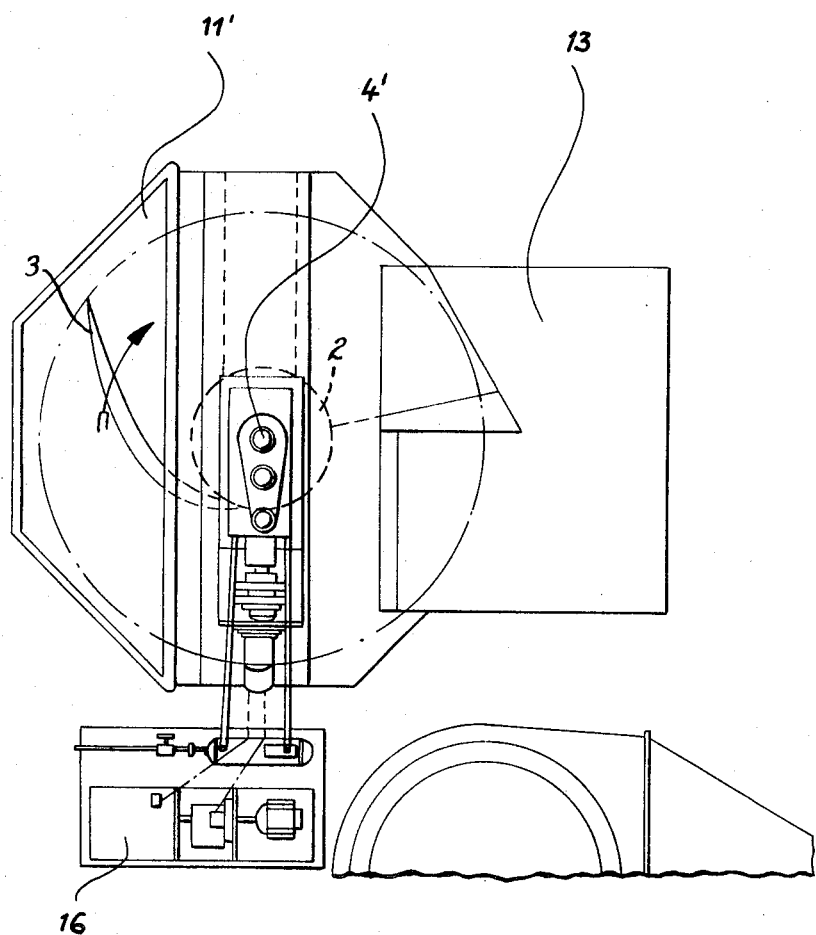
FIG. 5 is a schematic, partial top plan view of the embodiment of FIG. 4.

FIGS. 4 and 5 show discharge equipment especially suited for the discharge of limestone in a cement factory. Only a part of the horizontally rotating discharge wheel 2 enters casing 11 mounted under chute 11' and travels over the base of this casing chute. It is preferable to have the area of the chute 11' the same as the area of the base in which the discharge wheel passes through. Parallel to chute 11' a gravity chute 13 is located to which the rotating discharge wheel 2 conveys the bulk material from chute 11'. Wheel 2 rotates on a shaft 4'.

Housing 14 of the discharge wheel 2 is supported on load cells 15. Temperature measuring instruments are located in chute 13. These instruments are not illustrated. Connected to chute 13, but not shown, is a heated crushing machine which is used for drying and crushing the material discharged by the discharge wheel 2. In a system of this nature temperatures of approximately 400° C can be obtained.

To enable the complete system to be sealed against pressure — thereby retaining the hot gases used for drying purposes within the drying and crushing machine — the height of the material in chute 11' is kept at a constant level. Thus, a seal is provided. To achieve a constant head of material in chute 11', load cells 15 are used and these transmit impulses to bunker feeding equipment which is not shown.

At the same time, the rate of material discharged by the discharge wheel is regulated. In this manner it is possible when, for example, the rate of material discharged to the drying and crushing machine is too high and the temperature in this machine decreases, to reduce the speed of the discharge wheel 2,3 by means of the temperature sensing equipment located in chute 13.

The hydraulic unit designated 16 in the drawings is used to rotate the wheel 2, 3.

A further advantageous feature of the embodiment described above is that it can be used in tandem. With this arrangement the units are positioned symmetrically.

Figure 6:
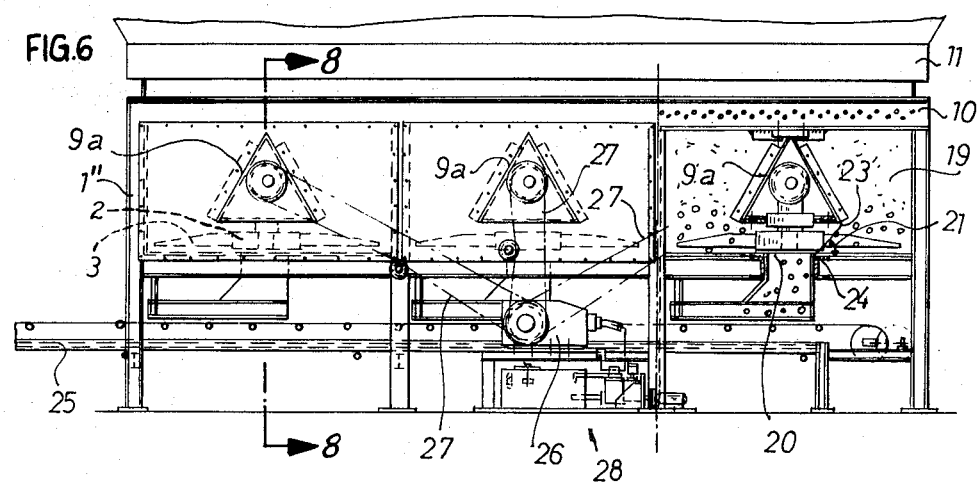
FIG. 6 is a schematic, side elevation view of a third embodiment of apparatus according to the present invention.
Figure 7:
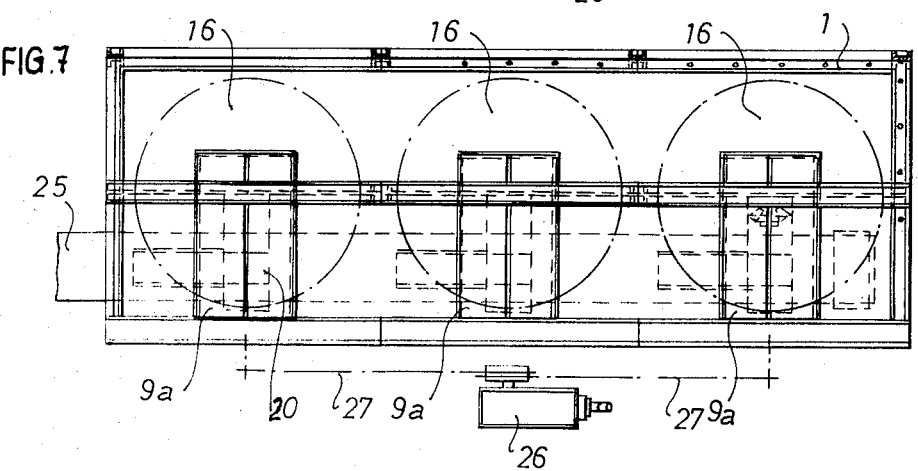
FIG. 7 is a top plan view of the apparatus shown in FIG. 6.
Figure 8:
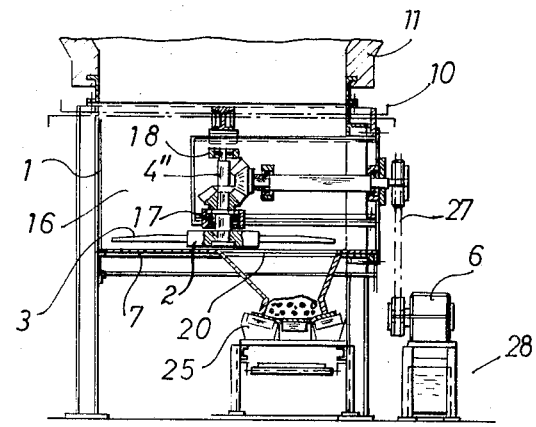
FIG. 8 is a partial, schematic cross-sectional view taken generally along the line 8—8 of FIG. 6.

In FIGS. 6 to 8 discharge equipment is shown which comprises three separate casings in which discharge wheels 2,3 are operating on a common continuous conveyor 25, in this instance a belt conveyor. 17 and 18 show the gears of the discharge wheel shaft 4 which is positioned at the end of a cantilever beam 9a. In turn, this cantilever beam of V-profile is attached to the casing 1", the other end extending to just past the discharge wheel shaft 4. In this manner, there is between cantilever 9a and casing 1" a free area 16 which in comparison with the other described forms of this equipment permits an increased area for the bulk material 19. The area through which the discharge wheel 2,3 passes through the material is also increased.

The proportions of each cantilever roof beam 9a are such that the edges 23 overlap the edges 24 of the discharge opening 20. In this manner, the bulk material makes an angle 21 from the corner of the cantilever roof beam 23 to the edge 24 of the discharge opening.

All the discharge wheels 2,3 have a common driving system 26. Mounted on the driving shaft drive system 26 are three chain sprockets 27, and each of these sprockets 27 is connected to a discharge wheel shaft 4" by gear assemblies. With this arrangement it is possible, when necessary, to dismantle one of the chains and thereby stopping a discharge wheel 2,3 without interfering with the operation of the remaining discharge wheels. Mounted in front of the gear system 26 is a hydraulic driving system 28 by which it is possible to vary the speed of rotation of the discharge wheel and, consequently, the quantity of material to be discharged.

Figure 9:
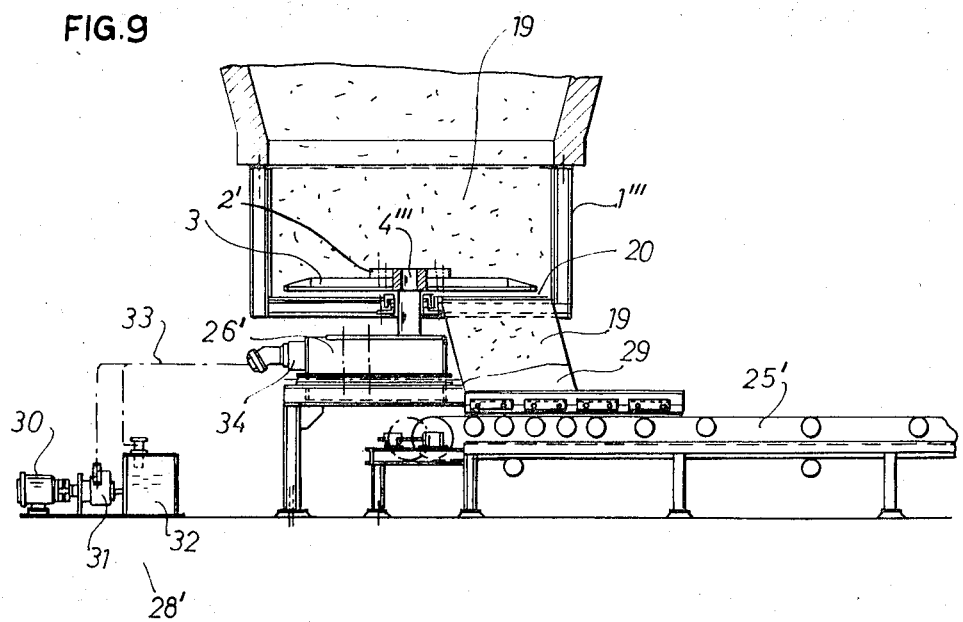
FIG. 9 is a schematic, side elevation view, partly in cross section, of yet another embodiment of apparatus accoding to the present invention.
Figure 10:
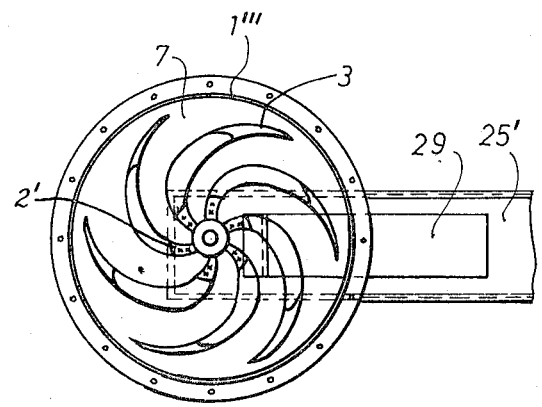
FIG. 10 is a top plan view of a part of the apparatus shown in FIG. 9.

In FIGS. 9 and 10 the discharge wheel 2',3 has a shaft 4''' which passes through the base 7 of casing 1''' and the gear is fastened to the underside of base 7. In base 7 of casing 1 an opening 20 is located and this opening is similar to those in FIGS. 6 to 8. A chute 29 is attached to opening 20 to enable material 19 to be fed to a belt conveyor 25'.

The discharge wheel shaft 4''' is in turn coupled to the driving system 26' which is operated by means of a hydraulic system 28. The hydraulic system 28' consists of an electric driving motor 30, a hydraulic pump 31, an oil reservoir 32, and an oil motor 34 which is connected to pump 31 by means of pipelines 33. It is possible to vary the speed of the hydraulic motor by known methods.

All new single features or a combination of the features made known in this description and/or the drawings will be seen to be of importance to the invention.

We claim:

1. Apparatus for assisting the discharge of bulk material from a chute to a conveying system, comprising, in combination:
   a. a stationary casing connected to a chute for sealing the lower end of same, and arranged in communication with a discharge opening of the chute;
   b. a discharge wheel arranged in said casing and mounted for rotation in a horizontal plane, said wheel having a plurality of arms each of which is forwardly curved in the form of a logarithmic spiral with the outer extremity of each arm extending in the direction of rotation of said wheel;
   c. means connected to said discharge wheel for rotating it in such direction;
   d. means defining an outlet in said stationary casing that is disposed between said discharge wheel and the conveying system whereby bulk material received from the chute is fed to the conveying system;
   e. a shaft for said discharge wheel;
   f. the chute being a vertical bottom sealed chute arranged approximately parallel to said shaft;
   g. the conveying system being in the form of a vertical chute arranged substantially parallel to said vertical bottom sealed chute; and
   h. said discharge wheel being arranged to only partially enter the area under said vertical bottom sealed chute and only partially enter the area over said vertical chute.

2. Apparatus as defined in claim 1, wherein said vertical bottom sealed chute and said vertical chute are arranged diametrically opposite with respect to said discharge wheel.

3. Apparatus as defined in claim 2, further including at least one load cell arranged to support said casing and produce impulses which control bunker feeding equipment.

* * * * *